United States Patent Office 2,980,558
Patented Apr. 18, 1961

2,980,558

PROCESS OF IMPREGNATING PAPER WITH SILICA SOLS

Donald F. Dempcy and Joseph M. Rule, Brandywine Hundred, Del., assignors to E. I. du Pont de Nemours and Company, Wilmington, Del., a corporation of Delaware No Drawing. Filed May 29, 1958, Ser. No. 738,612

4 Claims. (Cl. 117—152)

This invention relates to improving paper, more particularly the stiffness, especially at high relative humidities, of corrugating medium for corrugated paperboard, and is more specifically directed to such processes comprising impregnating the corrugating medium with a dilute, essentially salt-free sol of active, essentially non-aggregated silica at a pH below 6.0 and drying the impregnated medium.

Many attempts have heretofore been made to improve the strength of paper by treatment with silica sols, and many sols have been tried for this purpose. Paper has been treated, for example with various silica sols made by direct acidification of sodium silicate with various mineral acids. Such sols, of course, contain the metathetically formed sodium salts, and they do not confer a reasonable degree of reinforcement to the paper unless the paper is subsequently washed. Washing is highly impractical and very difficult to do, especially with paperboard. Furthermore paper treated with such sols is harsh due to the retained salts. Another difficulty in the use of such silica sols is that they are highly unstable because of the high concentration of salts and they undergo coalescence, aggregation, and eventually gelation, in a very short time. As a consequence it is very impractical to use salt-containing sols under conditions prevailing in a paper mill and, if the attempt is made, the paper treated shows only a negligible improvement in strength after the sols have reached an advanced stage of aggregation.

More recently it has been proposed to treat paper with silica sols prepared by resin deionization of sodium silicate and stabilized against gelation by adding back alkali metal ions. While these sols have better stability than those previously tried, it appears that they are too stable, because corrugating medium impregnated with such sols and dried does not show the desired increase in stiffness, especially at high humidities.

The difficulties above mentioned are of such magnitude that treatment of paper corrugating medium with silica sols by any method heretofore proposed has not found commercial acceptance and is not being practiced on any large scale.

Now according to the present invention it has been found that a commercially practicable process for improving the stiffness of paper corrugating medium comprises impregnating the corrugating medium with an essentially salt-free sol of active, non-aggregated silica at a pH below 6.0, and drying the impregnated product. Silica sols of this type have sufficient stability to be used under practical operating conditions, and the treated corrugating medium shows a sufficient increase in stiffness to warrant the cost of the treatment. Thus, a lighter grade of paper corrugating medium can be used for equivalent stiffness, or, if the thickness of the corrugating paper is not changed, a stiffer board can be produced. The improvement is especially marked at high relative humidities.

The silica sol used in a process of this invention is essentially salt free. This means that the ratio of silica to salt, expressed as the ratio of mols of $SiO_2$ to mols of salt, is greater than 500:1. This ratio is readily determinable upon any silica sol by ordinary methods of chemical analysis.

The silica particles in the sol must be substantially non-aggregated. The ultimate particles in silica sols have a strong tendency to aggregate and form clumps or clusters. When this process of aggregation has proceeded far enough, the aggregates become apparent to visual observation as lumps of silica gel. If the ultimate silica particles are large enough, say above about 5 millimicrons, the fact of whether they are discrete or aggregated can readily be observed by examination with the electron microscope. For particles below the limit of resolution of the electron microscope, the relative viscosity of the sol is an indication of the state of aggregation. The relative viscosity increases as the degree of aggregation increases. The initial relative viscosity of sols applicable in this invention, as measured at 5 percent $SiO_2$, is not substantially different from that of water and may, for instance, be in the range of from 1.08 to 2.0.

The silica sol as applied to the corrugating medium should be relatively dilute—that is, the $SiO_2$ content should not exceed about 15 percent by weight. More particularly, it is preferred to use sols containing from 1 to 10 percent $SiO_2$, the exact concentration being related to the rate of pick-up on the paper- or board-forming machine.

The treating sol must have a pH below 6.0. The sol should not, of course, be so acid as to tender the paper and hence, the pH should not be below 2. Preferably, the pH will be between 3.0 and 5.0.

The silica sols used are further characterized by containing active silica. The mean particle diameters of the ultimate particles in such sols never exceed 7 millimicrons and preferably do not exceed 3 millimicrons; ordinarily, the ultimate particles are substantially smaller. The concept of what constitutes "active" silica is well understood in the art, being described, for instance, in Alexander and Iler U.S. Patent 2,801,902 at column 7, line 69 et seq.

It is there pointed out that when sodium silicate is acidified silicic acid is released. The silicic acid initially may be in the form of orthosilicic acid, $Si(OH)_4$, but a condensation reaction occurs, whereby two silanol

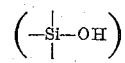

groups react to form a siloxane

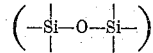

bond. This condensation may proceed until a predominate proportion of the silanol groups present have been used up to form siloxane bonds; the polymer thus formed will have a high molecular weight and the silica in it may be defined as "inactive." On the other hand, it will be understood that by the term "active" silica is meant silica in a low degree of polymerization. Thus, in active silica the condensation between silanol groups has not proceeded to a predominant extent.

It should be understood that active silica includes not only monomeric silica, but also certain polymeric forms of silica which are capable of depolymerization under suitable conditions, and hence are active for the purposes of the present invention. The rate of depolymerization under controlled conditions provides a measure of whether or not a particular silica is active within the meaning of the term as used in describing this invention. Active silica may be defined as any silica in molecular or colloidal aqueous solution in such a state of polymerization that when diluted with sodium hydroxide solution to a pH of about 12, corresponding to an alkali concentration of N/100, and an $SiO_2$ concentration of about 0.02 percent by weight of 30° C., in the absence of cations other than the sodium, the silica will depolymerize to monomer in not more than 100 minutes.

The depolymerization rate can be determined by methods well known in the art, such a method being described, for instance, in the above-mentioned Alexander and Iler Patent 2,801,902, starting at column 8, line 30.

Now, while active silica can exist at very low molecular weight as above described, it will be understood that in the processes of this invention the solutions used have undergone, spontaneously, sufficient polymerization that properly they must be called colloidal sols.

Sols of active silica suitable for use in processes of this invention can be prepared by various techniques with which the art is already familiar. For instance, the alkali of a sodium silicate solution can be neutralized with an acid and the metathetically formed salts can be immediately dialyzed out through a semi-permeable membrane. This method is somewhat difficult to use, however, because dialysis is relatively slow and the active silica has a strong tendency to polymerize until substantially all of the salt has been removed.

By far the best method of preparing silica sols for use in the novel processes comprises subjecting a relatively dilute sodium silicate solution to contact with cationic ion-exchange resin in the hydrogen form, whereby the sodium is abstracted from the sodium silicate leaving low molecular weight silicic acid. Such a method is described in Bird U.S. Patent 2,244,325. While the method of Bird is used up to the point of pH adjustment, it will be understood that the pH of the silica sol will be that of the ion-exchange effluent and there will be no upward adjustment of the pH nor concentration by evaporation as taught by Bird.

To reinforce paperboard according to a process of this invention the corrugating medium is impregnated with the silica sol so as to effect substantially complete penetration of the sol throughout the body of the sheet. The sol can be applied by any convenient method such as immersion, spraying, or coating from a transfer roll. The treatment can be effected at any point on the paper machine or in a later, separate operation. Thus, it can be sprayed on the corrugating medium even after the medium has been shaped on the fluting rolls.

The corrugating medium treated can be made from any suitable fiber furnish including, for example, corrugating medium made from straw pulp, chestnut pulp, semi-chemical pulp, kraft pulp, or waste pulps, the latter commonly referred to as bogusboard.

The amount of silica sol applied to the corrugating medium in a process of this invention must be enough to deposit within the paper the critical amount of silica necessary to develop improved stiffness. At least 0.5 percent silica is required and preferably at least 1.5 percent is used, the silica being expressed as percent $SiO_2$ based on the dry weight of the untreated paperboard. The maximum amount is limited only by the fact that when too much is used, there is a tendency to develop brittleness. Amounts up to about 8 percent can usually be used without difficulty.

After corrugating medium has been treated with the silica sol, it is dried by methods conventional in the art for drying paper. Thus, it may be passed through a drying oven, or it may be dried by using heated corrugating rolls. The corrugated medium does not need to be absolutely dry before being made up into corrugated board. Rather, the stiffness can be developed by completing the drying as part of the drying operation on the fabricated board.

In its broadest aspects, the method of this invention is useful in improving the properties, especially the stiffness, of any type of cellulosic paper, especially paperboard. This includes, for example, kraft or jute linerboard, paperboard used as the inner and outer plies of laminated solid fiberboard, paperboard used in the manufacture of wound tubes and drums, and paperboard used in the manufacture of various folding cartons.

The invention will be better understood by reference to the following illustrative example.

*Example*

A dilute silica sol which was essentially salt free and contained non-aggregated, active silica particles was prepared by passing a solution of a commercial 3.25 $SiO_2$:1$Na_2O$ ratio sodium silicate containing 4.3 percent $SiO_2$, through a freshly regenerated cation-exchange resin, at such a rate that the sodium was completely abstracted by the resin. The effluent contained 4.0 percent $SiO_2$ by weight, had a pH of 3.1 and a relative viscosity, as measured at 5 percent $SiO_2$ which was close to 1.

A portion of this silica sol was diluted to 0.714 percent $SiO_2$ with water. The pH after dilution was 5.1. Into this treating solution was immersed a quantity of 26 lb. per 1000 sq. ft. bogus corrugating medium. The solution pick-up was 144 percent, giving a retention of 1 percent $SiO_2$ corrugating medium.

Another portion of the original sol was diluted to 2.14 percent $SiO_2$ whereupon it had a pH of 4.8. This also was used for treating corrugating medium, the solution pick-up being 142 percent, giving an $SiO_2$ content in the dried product of 3 percent.

A third portion of the original silica sol was diluted to 3.57 percent $SiO_2$ at a pH of 4.1. The diluted sol was used for treating corrugating medium to a solution pick-up of 141 percent or an $SiO_2$ content, on a dry basis, of 5.0 percent.

Samples of each of the treated papers along with controls were die cut into approximately one-half inch by two-inch strips and six of each series were exposed, after drying, to 50 to 55 percent, 81 percent, and 98 percent relative humidity. After three days' exposure these strips were placed in a ring mold and the force required to crush the paper ring was measured. This measurement was made as a Riehle stiffness test. The results were as follows:

| Percent $SiO_2$ | Riehle Stiffness—lbs. | | | Relative Stiffness—Control=100 at each $SiO_2$ Content | | |
|---|---|---|---|---|---|---|
| | 50–55% RH | 81% RH | 98% RH | 50–55% RH | 81% RH | 98% RH |
| 1 | 17.5 | 14.0 | 3.8 | 125 | 114 | 115 |
| 3 | 20.7 | 16.0 | 5.7 | 148 | 130 | 173 |
| 5 | 19.7 | 15.3 | 4.7 | 141 | 124 | 143 |
| 0 (Control) | 14.0 | 12.3 | 3.3 | | | |

We claim:

1. In a process for improving paper the steps comprising impregnating the paper with an essentially salt-free sol of active, non aggregated silica at a pH below 6.0, the sol having an $SiO_2$ content not exceeding 15% by weight and said silica being in the form of particles having a size not exceeding 7 millimicrons, and drying the impregnated product, the amount of silica deposited in the paper being at least 0.5% based on the dried weight of the treated product.

2. In a process for improving the stiffness of paper corrugating medium the steps comprising impregnating the corrugating medium with an essentially salt-free sol of active, non-aggregated silica at a pH below 6.0, the sol having an $SiO_2$ content not exceeding 15% by weight and said silica being in the form of particles having a size not exceeding 7 millimicrons, the amount of silica so introduced being more than 0.5 percent based on the dried weight of treated product, and drying the impregnated product.

3. In a process for improving the stiffness of paper corrugating medium the steps comprising impregnating the corrugating medium with an essentially salt-free sol of active, non-aggregated silica at a pH in the range of 2.0 to 5.0, the sol having an $SiO_2$ content not exceeding 15% by weight and said silica being in the form of particles having a size not exceeding 7 millimicrons, and drying the impregnated product, the amount of silica deposited in the paper being at least 0.5% based on the dried weight of the treated product.

4. In a process for improving the stiffness of paper corrugating medium the steps comprising removing the sodium ions from the dilute sodium silicate solution by passing it in contact with a cationic-exchange resin in hydrogen form to give a silica sol having an $SiO_2$ content not exceeding 15% by weight, the silica being in the form of particles having a size not exceeding seven millimicrons, impregnating at a pH below 6, a paper corrugating medium with the freshly prepared silica sol so obtained, the proportion of silica so introduced being at least 0.5 percent based on the dry weight of final product, and drying the impregnated product.

References Cited in the file of this patent

UNITED STATES PATENTS

| | | |
|---|---|---|
| 2,244,325 | Bird | June 3, 1941 |
| 2,408,656 | Kirk | Oct. 1, 1946 |
| 2,441,422 | Krieble | May 11, 1948 |
| 2,441,423 | Elliott | May 11, 1948 |
| 2,457,971 | Voorhees | Jan. 4, 1949 |
| 2,577,485 | Rule | Dec. 4, 1951 |
| 2,801,938 | Iler | Aug. 6, 1957 |
| 2,892,797 | Alexander et al. | June 30, 1959 |